United States Patent

[11] 3,584,459

| [72] | Inventor | Charles A. Amann<br>Bloomfield Hills, Mich. |
|---|---|---|
| [21] | Appl. No. | 759,324 |
| [22] | Filed | Sept. 12, 1968 |
| [45] | Patented | June 15, 1971 |
| [73] | Assignee | General Motors Corporation<br>Detroit, Mich. |

[54] GAS TURBINE ENGINE WITH COMBUSTION CHAMBER BYPASS FOR FUEL-AIR RATIO CONTROL AND TURBINE COOLING
8 Claims, 6 Drawing Figs.

[52] U.S. Cl. ............................................. 60/39.23,
60/39.27, 60/39.51, 60/39.16, 60/39.29, 60/39.65,
60/39.66
[51] Int. Cl. ................................................. F02c 9/02,
F02c 9/14, F02c 7/12
[50] Field of Search............................................. 60/39.03,
39.06, 39.27, 39.26, 39.29, 39.23, 240, 39.51,
39.16, 39.65, 39.66

[56] References Cited
UNITED STATES PATENTS

| 2,227,666 | 1/1941 | Noack | 60/39.23 X |
| 2,353,929 | 7/1944 | Ray | 60/39.27 X |
| 2,482,394 | 9/1949 | Wyman | 60/39.23 X |
| 2,618,926 | 11/1952 | Pfenninger | 60/39.27 X |
| 2,627,719 | 2/1953 | Stalker | 60/39.23 X |
| 2,644,299 | 7/1953 | Williams | 60/39.23 |
| 2,670,598 | 3/1954 | Van Millingen | 60/39.27 X |
| 2,655,787 | 10/1953 | Brown | 60/39.27 X |
| 2,837,894 | 6/1958 | Kind | 60/39.27 |
| 2,940,257 | 6/1960 | Eckert et al. | 60/39.23 X |

FOREIGN PATENTS

| 680,667 | 10/1952 | Great Britain | 60/39.27 |

*Primary Examiner*—Al Lawrence Smith
*Attorneys*—Paul Fitzpatrick and E. W. Christen ABSTRACT: A gas turbine engine which may otherwise be of conventional configuration, single or plural shaft, regenerative or nonregenerative, is provided with a controlled bypass from the compressor to the turbine bypassing the combustion apparatus. Flow through this bypass is controlled so as to maintain the fuel-air ratio in the combustion chamber substantially constant notwithstanding variations in fuel flow and airflow with the load carried by the engine. Control of flow through the bypass may respond to setting of the fuel control device, to compressor discharge pressure, or to burner outlet temperature.

PATENTED JUN 15 1971 3,584,459

INVENTOR
Charles A. Amann
BY
Paul Fitzpatrick
ATTORNEY

GAS TURBINE ENGINE WITH COMBUSTION CHAMBER BYPASS FOR FUEL-AIR RATIO CONTROL AND TURBINE COOLING

My invention is directed to gas turbine engines, and particularly involves control of the fuel-air ratio in the combustion apparatus of the engine so as to maintain clean combustion and minimize undesired exhaust emissions which might otherwise occur at some load conditions on the engine.

The usual gas turbine engine includes at least one compressor, a combustion apparatus supplied by the compressor, and a turbine energized from the combustion apparatus and driving the compressor. In some cases a second turbine is provided to drive the load, this turbine ordinarily being a low-pressure turbine energized from the exhaust of the compressor-driving turbine. In some cases a heat exchanger, called a regenerator, is provided to extract heat from the turbine exhaust and supply it to the compressed air flowing to the combustion chamber.

Generally speaking, gas turbine combustion apparatus ordinarily involves a fixed structure to which fuel and air are introduced and there intimately mixed. The combustion apparatus ordinarily embodies a primary or combustion zone in which the fuel is burned in the air roughly at stoichiometric ratio and a secondary or dilution zone in which additional air is mixed with the combustion products from the combustion zone so as to bring the temperature of the motive fluid down to a level tolerable to the turbine. Some combustion may occur in the secondary zone. With such a fixed geometry combustion apparatus, the hole pattern of the combustion liner to distribute the air between the two zones is ordinarily designed for most favorable operation at or near full load. With such apparatus, when the engine is running under light load or under idling conditions, the overall fuel-air ratio in the combustion chamber decreases but the distribution of air between the primary and secondary zones does not change accordingly. The result is a leaner mixture in the primary or combustion zone which can lead to reduced combustion efficiency and consequent increase in undesired exhaust emissions. The increase in emissions is further favored by reduced turbine inlet temperature and reduced burner inlet temperature accompanying load reduction in may cycles.

According to my invention, a bypass is provided around the combustion apparatus from the compressor outlet to the turbine inlet with means to control the bypass so as to maintain the fuel to air ratio in the combustion apparatus nearly enough constant to minimize any increase in exhaust emissions at low load conditions.

The principal object of my invention is to provide a gas turbine engine with improved cleanness of exhaust, to provide a gas turbine engine which operates efficiently at full load but with a clean exhaust at light load conditions, to provide a method of operating a gas turbine engine so as to minimize undesired exhaust emissions, and to provide means for bypassing the combustion apparatus so controlled as to maintain a substantially constant fuel to air ratio in the combustion apparatus notwithstanding variations in load on the engine and other operating conditions.

The nature of my invention and the advantages thereof will be clear to those skilled in the art from the following detailed description of preferred embodiments of my invention and the accompanying drawings thereof.

Figure 1:
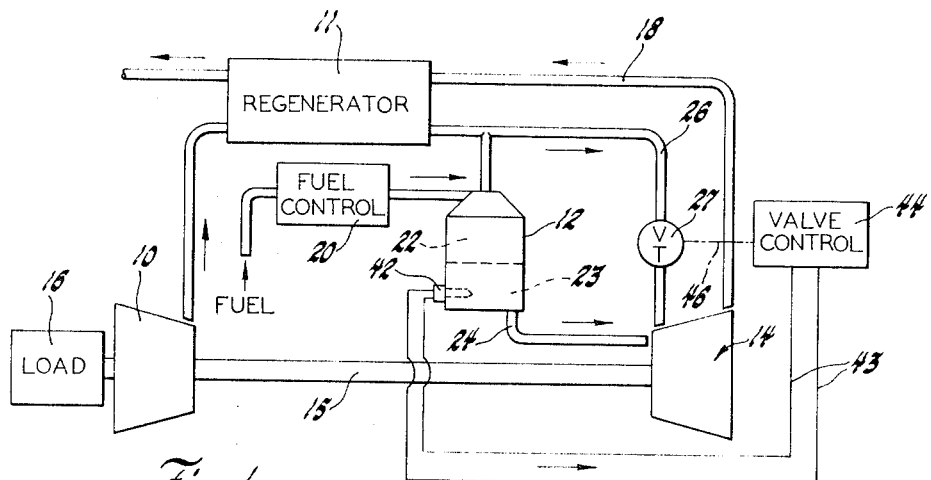
FIG. 1 is a schematic diagram of a regenerative single shaft engine incorporating one embodiment of my invention.
Figure 2:
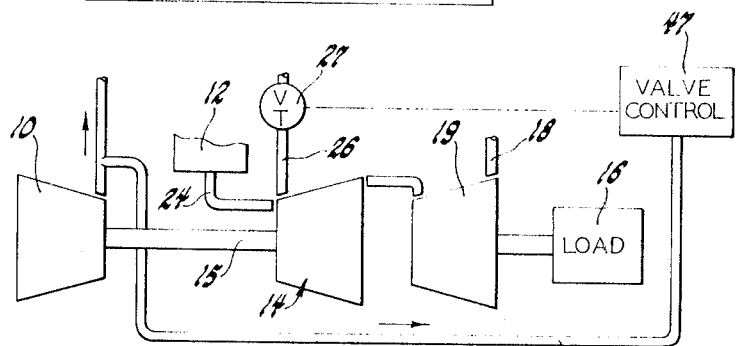
FIG. 2 is a partial schematic diagram of a gas-coupled gas turbine engine incorporating another embodiment of my invention.

Engine configurations as illustrated in FIGS. 1 and 2 are familiar to those skilled in the art of gas turbines, but may be described briefly. The single shaft regenerative engine of FIG. 1 includes a compressor 10 which discharges compressed air through a heat exchanger or regenerator 11 to a combustion apparatus 12, which delivers combustion products to a turbine 14 connected through a shaft 15 to drive the compressor 10 and a load 16. The turbine exhausts through a duct 18 which conducts the exhaust gas to the regenerator 11 in which it heats the compressed air flowing to the combustion apparatus. The heat exchanger 11 may, of course, be omitted.

The two-shaft or gas-coupled engine of FIG. 2 embodies many of the same elements as the engine of FIG. 1, and they are correspondingly numbered. However, the engine of FIG. 2 includes a second or low-pressure turbine 19 energized from the exhaust of the compressor driving turbine 14 which discharges into the exhaust line 18 and which drives the load 16, turbine 14 driving only the compressor in this type of engine. A regenerator as shown in FIG. 1 may be provided if desired.

In either engine fuel is supplied from any suitable source through a suitable fuel control 20 to the combustion apparatus 12 in which it is suitably atomized and mixed with the compressed air flowing into the combustion apparatus. As indicated schematically by the dotted line in FIG. 1, the combustion apparatus 12 includes a primary or combustion zone 22 and a secondary or dilution zone 23 downstream from the combustion zone from which the combustion products flow into the turbine 14 through a combustion products duct 24. Such combustion chambers are well known. That shown in Tomlinson U.S. Pat. No. 3,064,424 for Flame Tube, Nov. 29, 1962 may be taken as illustrative.

In both FIG. 1 and FIG. 2, a combustion chamber bypass conduit 26 takes air from ahead of the entrance to the combustion chamber and delivers it to the entrance to the turbine, bypassing the combustion chamber. If a regenerator is provided, the bypass preferably takes air from downstream of the regenerator. Flow through the bypass 26 is controlled by a regulating or throttle valve 27 activated in response to any of various parameters or conditions indicative of the quantity of air that should be bypassed, as will be explained. For the present, the function of valve 27 may be explained with relation to the curves of FIGS. 5 and 6.

Figures 5, 6:
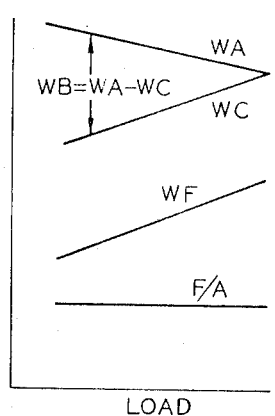
FIG. 5 is a diagram illustrating variations of airflow, fuel flow, and fuel-air ratio with load in a typical single shaft nonregenerative constant speed gas turbine engine.
FIG. 6 is a diagram illustrating the variations of airflow, fuel flow, and fuel-air ratio with load in an engine incorporating my invention.

FIG. 5 illustrates the variation with load of air flow (WA), fuel flow (WF) and overall fuel-air ratio (F/A), for a conventional single shaft nonregenerative constant speed gas turbine engine. FIG. 6 shows the same lines along with bypass flow (WB) and flow of air through the combustion apparatus (WC) for an engine with a bypass around the combustion apparatus controlled in accordance with my invention. As shown in FIG. 5, as load increases, the weight of air decreases and the weight of fuel increases. The ratio of fuel to air increases very considerably from idling conditions to full load. The exact degree of variation and shape of the curve will, of course, depend upon the engine structure. Engines of other types may have somewhat different curves but the trend toward increased fuel-air ratio as load increases is common to gas turbines of various cycles. FIG. 6 illustrates the engine with my bypass in which, as the weight of fuel decreases with load, the air bypassed also increases so that the flow through the combustion apparatus decreases as load decreases so as to maintain the ratio of fuel to air substantially constant. The total airflow is the same in FIG. 6 as in FIG. 5 but sufficient is bypassed to eliminate the substantial variation in fuel-air ratio illustrated in FIG. 5.

It should be noted that if this bypassed air is introduced to the turbine in such a way as to mix adequately with the flow from the combustion apparatus, the entrance conditions to the turbine are unaffected by the presence of the bypass line so the thermodynamics of the engine cycle remain constant notwithstanding the bypass. So far as the turbine is concerned, the bypass merely changes the point in which some of the dilution air is mixed with the combustion products. The bypassed air should reenter the motive fluid circuit downstream of the point at which combustion reactions have been completed.

Figure 4:
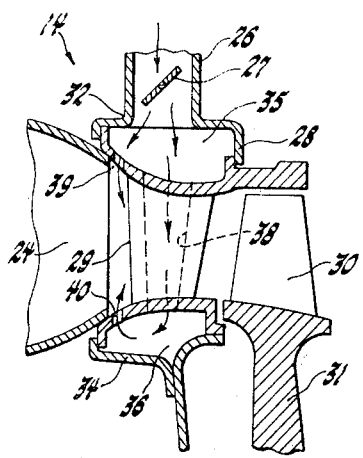
FIG. 4 is a fragmentary sectional view of a turbine taken on a plane containing the axis of rotation of the turbine rotor.

FIG. 4 illustrates somewhat schematically a typical turbine structure incorporating means to deliver the air from the bypass 26 to the turbine inlet. The structure of FIG. 4 also makes it possible to cool the turbine nozzle if desired. In that figure, the duct carrying the combustion products to the turbine is illustrated at 24 and the bypass at 26. The turbine includes a nozzle 28 with vanes 29 which delivers the motive products to blades 30 on a turbine wheel 31. The nozzle includes a hollow outer shroud 32 and a hollow inner shroud 34. These shrouds define annular chambers 35 and 36 for the bypassed air. The bypass 26 delivers air to the outer chamber 35 from which it flows through passages 38 extending spanwise through the vanes to the inner chamber 36. The air enters the motive fluid path between the nozzle shrouds through rings of holes 39 in the outer shroud and 40 in the inner shroud, these being located immediately upstream of the leading edge of the vanes 29. This tends to concentrate the bypass flow, which is cooler than the motive fluid, at the leading edge of the vanes so as to provide the maximum cooling benefit.

The bypass for controlling fuel-air ratio, of course, bypasses air primarily when the engine is at light load at which point temperature of the turbine is not high. However, as will be apparent, a sufficient amount of air for cooling may be bypassed through ducts 26 at full load or high load levels so as to cool the turbine. The amount of air required for cooling would ordinarily be a very small part of that bypassed at idle to maintain the desired fuel-air ratio.

If cooling is not desired or if it is desirable in a particular engine to bypass more air than can readily be handled by the turbine cooling arrangement shown in FIG. 4, additional air may be mixed with the combustion products at the entrance to the turbine by any suitable mixing structure. A mixing device of this general nature is shown, for example, in U.S. Pat. to Schorner No. 2,806,355 for Axial Flow Turbine with Means for Mixing Low Temperature Gas into the High Temperature Driving Gas Stream, issued Sept. 17, 1957.

It may be noted that the throttling or control valve 27 is illustrated in FIG. 4 as simple butterfly valve. Such a throttling valve could, of course, be of any suitable structure.

As previously indicated, various parameters or conditions may be relied upon for control of the bypass regulating valve 27. The desired object is to maintain the fuel-air ratio in the combustion chamber substantially constant. Depending upon the type of engine and the degree of accuracy of control required, various arrangements for this purpose may be adopted, several of which are show in the drawings.

In FIG. 1, control responds to a temperature-measuring device located to measure the temperature of the combustion products. As illustrated in FIG. 1, the temperature-measuring device is a thermocouple 42 located at the outlet end of the combustion apparatus and connected through leads 43 to a suitable valve control servo device 44. The servo device is indicated as connected through a linkage 46 to the valve 27. In this case the valve control or servo 44 may be any suitable device which opens and closes the valve so as to maintain the temperature sensed by the thermocouple approximately constant. In this case, a constant temperature will indicate a substantially constant fuel-air ratio subject to minor variations from such factors as ambient temperature.

In a free shaft engine as shown in FIG. 2, the compressor discharge pressure varies substantially over the load range. In FIG. 2 the valve control servo 47 responds to a signal of compressor discharge pressure tapped from the compressor outlet and supplied to the servo through a line 48. In this case the servo may be scheduled so as to operate the valve to bypass more air when the compressor discharge pressure sense indicates a light load condition. The particular schedule will, of course, be a function of the characteristics of the particular engine which may be determined by computation or experiment.

Figure 3:
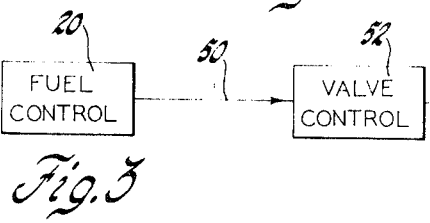
FIG. 3 is a partial schematic diagram illustrating a further variation in control of the combustion chamber bypass.

FIG. 3 is a fragmentary view illustrating still another control in which a connection indicated at 50 communicates a sense of the fuel control setting or actual fuel flow from the fuel control 20 to a valve control 52 which actuates the regulating valve 27. Having the fuel flow and airflow characteristics of a particular engine in terms of fuel control setting or fuel flow, the servo 52 may readily be set up to control the valve 27 in such manner as to maintain a constant or substantially constant fuel-air ratio in the combustion apparatus 12.

In general, with any of the controls illustrated in FIGS. 1, 2, and 3, there will be maximum bypass at idling with the bypass flow decreasing with increasing load and ordinarily being shut off altogether except that valve 27 may be caused to open slightly at or near full load to supply cooling air to the turbine. Valve opening can be scheduled in terms of any of the controlling parameters mentioned above and undoubtedly in terms of other parameters which provide an indication of engine fuel-air ratio.

It will be apparent from the foregoing that my invention provides means easily added to conventional gas turbine engines to bypass some of the air around the combustion chamber under operating conditions at which otherwise the fuel-air ratio would be too lean for most perfect combustion and thus conducive to generation of undesired impurities in the exhaust. The system for maintaining the clean exhaust may also be integrated with a scheme for cooling the turbine, if desired.

The detailed description of preferred embodiments of the invention for the purpose of explaining the principles thereof is not to be considered as limiting or restricting the invention, since many modifications may be made by the exercise of skill in the art without departing from the scope of the invention.

I claim:

1. A gas turbine engine comprising, in combination, a compressor, a turbine connected to drive the compressor, and combustion apparatus of fixed geometry with a combustion zone, a dilution zone downstream from the combustion zone, an outlet for motive fluid from the dilution zone into the turbine inlet, and means connecting each of the said zones unvaryingly to the compressor outlet for supply of air to the zones, in combination with an air conduit from the compressor outlet to the turbine inlet bypassing the said combustion apparatus, a regulating valve in the air conduit, and means to operate the valve so as to bypass air in such quantities as to maintain the ratio of total air supplied to both of the combustion and dilution zones of the combustion apparatus to the fuel supplied to the combustion apparatus substantially invariant with variations in load on the engine.

2. An engine as recited in claim 1 in which the last-recited means includes means controlled by motive fluid temperature.

3. An engine as recited in claim 1 in which the last-recited means includes means controlled by compressor discharge pressure.

4. An engine as recited in claim 1 including a regenerator for heating the motive fluid by extracting heat from exhaust gas before entry of the motive fluid into the combustion apparatus and in which the said air conduit is supplied through the regenerator.

5. An engine as recited in claim 1 in which the turbine inlet includes a flow-directing nozzle having vanes and a shroud, the air conduit bypassing the combustion apparatus extends to the said nozzle, and means are provided for cooling the turbine nozzle with the bypassed air.

6. A gas turbine engine comprising, in combination, a compressor, a turbine connected to drive the compressor, combustion apparatus of fixed geometry connected for flow of motive fluid from the compressor outlet to the turbine inlet, the turbine inlet including a flow-directing nozzle having vanes and a shroud, an air conduit from the compressor outlet to the turbine nozzle bypassing the combustion apparatus, a regulating valve in the air conduit, means to operate the valve so as to bypass air past the combustion apparatus to the turbine nozzle in such quantities as to maintain the fuel-air ratio in the combustion apparatus substantially invariant with variations in load on the engine, and means to flow the bypassed air through the turbine nozzle to cool the nozzle.

7. An engine as recited in claim 6 including also means to control the valve so as to supply bypassed air for turbine cooling at high engine power levels.

8. A gas turbine engine comprising, in combination, a compressor a turbine connected to drive the compressor, combustion apparatus of fixed geometry connected for flow of motive from the compressor outlet to the turbine inlet, the turbine inlet including a flow-directing nozzle having vanes and a shroud, an air conduit from the compressor outlet to the turbine nozzle bypassing the combustion apparatus, a regulating valve in the air conduit, means to operate the valve so as to bypass air past the combustion apparatus to the turbine nozzle in such quantities as to maintain the fuel-air ratio in the combustion apparatus substantially invariant with variations in load on the engine, the nozzle shroud and vanes being hollow, the air conduit leading into the nozzle shroud, the air flowing through the shroud and vanes, and the outlet means for the air from the nozzle being defined into the motive fluid path upstream of the vanes.

PO-1050
(5/69)

UNITED STATES PATENT OFFICE
CERTIFICATE OF CORRECTION

Patent No. __3,584,459__          Dated __June 15, 1971__

Inventor(s) __Charles A. Amann__

It is certified that error appears in the above-identified patent and that said Letters Patent are hereby corrected as shown below:

Column 1, line 43, "may" should read -- many --.

Column 3, line 51, "show" should read -- shown --.

Column 5, line 10, before "from" insert -- fluid --.

Signed and sealed this 22nd day of February 1972.

(SEAL)
Attest:

EDWARD M. FLETCHER, JR.         ROBERT GOTTSCHALK
Attesting Officer             Commissioner of Patents